United States Patent
Seiden et al.

(10) Patent No.: US 12,321,342 B1
(45) Date of Patent: *Jun. 3, 2025

(54) COMPILING OPTIMIZED DATABASE STATEMENTS

(71) Applicant: SIGMA COMPUTING, INC., San Francisco, CA (US)

(72) Inventors: Max H. Seiden, San Francisco, CA (US); Deepanshu Utkarsh, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,160

(22) Filed: Feb. 13, 2024

Related U.S. Application Data

(63) Continuation of application No. 18/186,066, filed on Mar. 17, 2023, now Pat. No. 11,989,177, which is a continuation of application No. 17/061,148, filed on Oct. 1, 2020, now Pat. No. 11,663,203.

(51) Int. Cl.
G06F 16/242 (2019.01)
G06F 16/245 (2019.01)
G06F 16/2453 (2019.01)

(52) U.S. Cl.
CPC ...... *G06F 16/2428* (2019.01); *G06F 16/2423* (2019.01); *G06F 16/2454* (2019.01)

(58) Field of Classification Search
None
See application file for complete search history.

(56) References Cited

U.S. PATENT DOCUMENTS

| | | | |
|---|---|---|---|
| 8,661,023 B1 * | 2/2014 | Chun | G06F 16/9027 707/718 |
| 9,183,254 B1 | 11/2015 | Cole et al. | |
| 10,936,589 B1 * | 3/2021 | Beitchman | G06F 16/24542 |
| 2007/0233655 A1 * | 10/2007 | Engels | G06F 16/2428 |
| 2009/0077013 A1 * | 3/2009 | Hu | G06F 16/24534 |
| 2014/0095469 A1 * | 4/2014 | Chen | G06F 16/3325 707/E17.054 |

(Continued)

OTHER PUBLICATIONS

Stackoverflow, "Setting a Limit before JOINs of tables", pp. 1-2, https://stackoverflow.com/questions/38700572/setting-a-limit-before-joins-of-tables (Year: 2016).*

(Continued)

*Primary Examiner* — Son T Hoang

(57) ABSTRACT

Compiling optimized database statements including receiving, by a query compiler from a client computing system, a state specification of a graphical user interface in response to a user manipulating the graphical user interface on the client computing system, wherein the state specification is in a standard file format and describes modifications to a plurality of visual elements of the graphical user interface; compiling, by the query compiler, a database statement from the state specification such that a limit clause within the database statement is processed by a database before at least one join clause; and sending, by the query compiler, the optimized database statement to a database on a cloud-based data warehouse.

20 Claims, 6 Drawing Sheets

(56) References Cited

U.S. PATENT DOCUMENTS

| | | | |
|---|---|---|---|
| 2015/0356141 A1* | 12/2015 | Yan | G06F 16/284 |
| | | | 707/718 |
| 2017/0193398 A1* | 7/2017 | Schmidt | G06F 16/2453 |
| 2018/0121326 A1 | 5/2018 | Qi et al. | |
| 2018/0218038 A1 | 8/2018 | Katahira et al. | |
| 2020/0089796 A1 | 3/2020 | Seiden et al. | |
| 2021/0279043 A1* | 9/2021 | Egenolf | G06F 16/24544 |
| 2021/0382920 A1* | 12/2021 | Eltabakh | G06F 16/288 |

OTHER PUBLICATIONS

Anonymous, "Does using LIMIT improve the performance and is it noticeable?," XP055876708, URL:https://dba.stackexchange.com/questions/52079/does-using-limit-improve-the-performance-and-is-it-noticeable/52087#52087 [retrieved on Jan. 6, 2022], Jun. 25, 2020, 5 pages.

International Search Report and Written Opinion, PCT/US2021/053112, Jan. 18, 2022, 10 pages.

* cited by examiner

COMPILING OPTIMIZED DATABASE STATEMENTS

BACKGROUND

Field of the Invention

The field of the invention is data processing, or, more specifically, methods, apparatus, and products for compiling optimized database statements.

Description of Related Art

Modern businesses may store large amounts of data in remote databases within cloud-based data warehouses. This data may be accessed using database query languages, such as structured query language (SQL). Manipulating the data stored in the database may require constructing complex queries beyond the abilities of most users.

SUMMARY

Methods, systems, and apparatus for compiling optimized database statements. Compiling optimized database statements includes receiving, by a query compiler from a client computing system, a state specification of a graphical user interface in response to a user manipulating the graphical user interface on the client computing system, wherein the state specification is in a standard file format and describes modifications to a plurality of visual elements of the graphical user interface; compiling, by the query compiler, a database statement from the state specification such that a limit clause within the database statement is processed by a database before at least one join clause; and sending, by the query compiler, the optimized database statement to a database on a cloud-based data warehouse.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
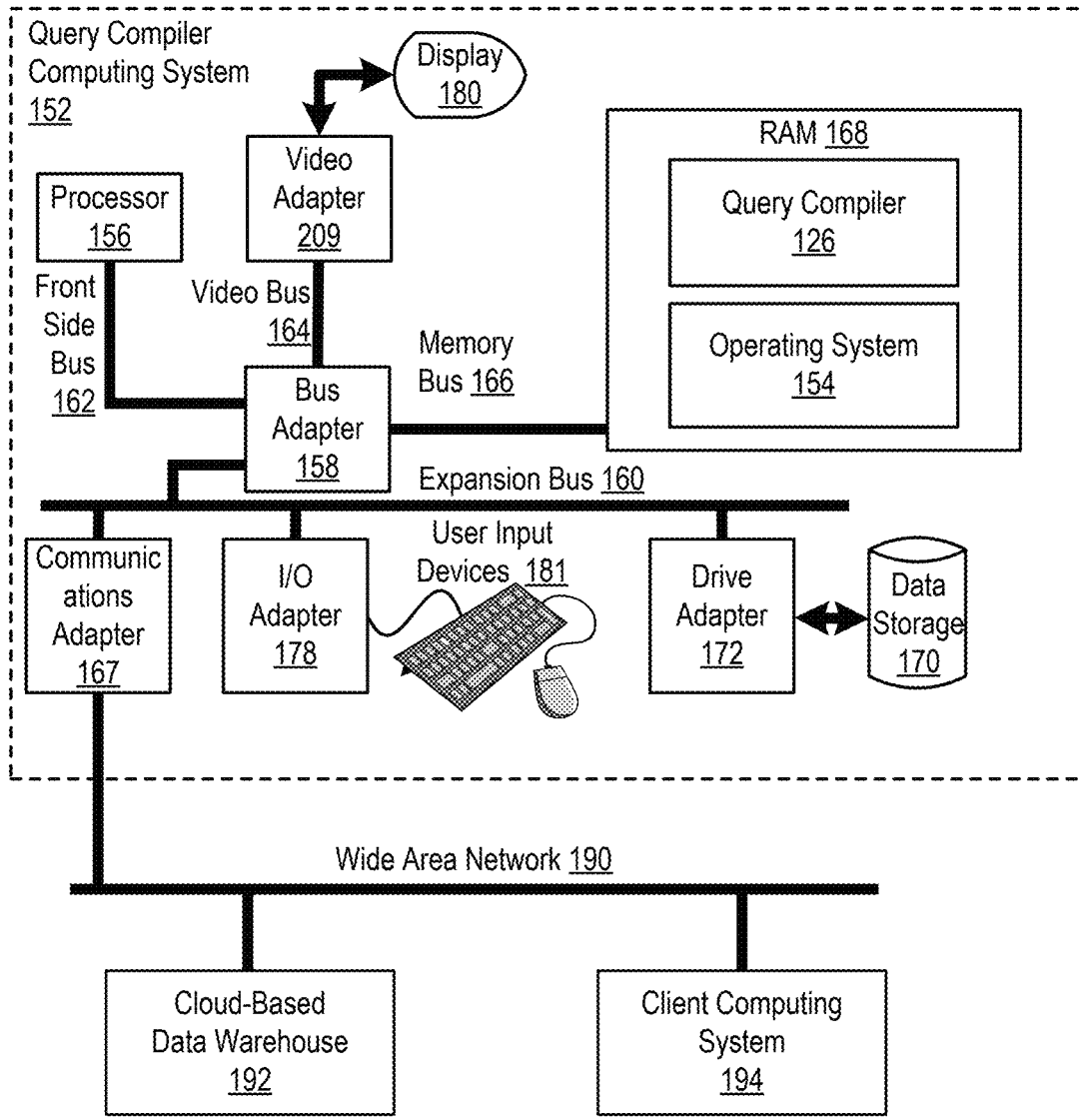
FIG. 1 sets forth a block diagram of an example system configured for compiling optimized database statements according to embodiments of the present invention.

Exemplary methods, apparatus, and products for compiling optimized database statements in accordance with the present invention are described with reference to the accompanying drawings, beginning with FIG. 1. FIG. 1 sets forth a block diagram of automated computing machinery comprising an exemplary query compiler computing system (152) configured for compiling optimized database statements according to embodiments of the present invention. The query compiler computing system (152) of FIG. 1 includes at least one computer processor (156) or 'CPU' as well as random access memory (168) ('RAM') which is connected through a high speed memory bus (166) and bus adapter (158) to processor (156) and to other components of the query compiler computing system (152).

Stored in RAM (168) is an operating system (154). Operating systems useful in computers configured for compiling optimized database statements according to embodiments of the present invention include UNIX™, Linux™, Microsoft Windows™, AIX™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the query compiler (126), a module for compiling optimized database statements according to embodiments of the present invention.

The query compiler computing system (152) of FIG. 1 includes disk drive adapter (172) coupled through expansion bus (160) and bus adapter (158) to processor (156) and other components of the query compiler computing system (152). Disk drive adapter (172) connects non-volatile data storage to the query compiler computing system (152) in the form of data storage (170). Disk drive adapters useful in computers configured for compiling optimized database statements according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example query compiler computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example query compiler computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary query compiler computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for compiling optimized database statements according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client computing system (194). The cloud-based data warehouse (192) is a computing system or group of computing systems that hosts a database or databases for access over the wide area network (190). The client computing system (194) is a computing system that accesses the database using the query compiler (126) on the query compiler computing system (152).

Figure 2:
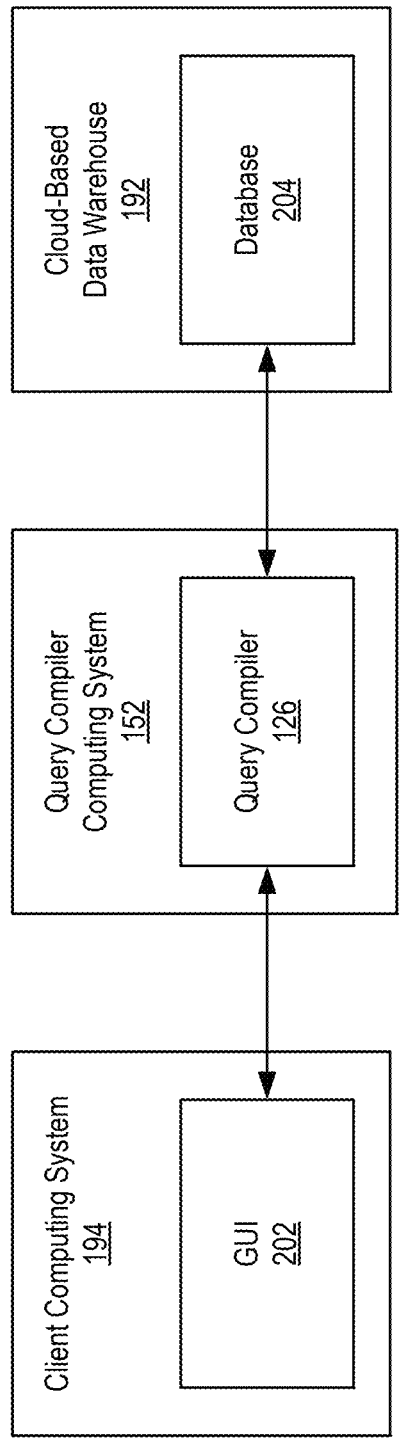
FIG. 2 sets forth a block diagram of an example system configured for compiling optimized database statements according to embodiments of the present invention.

FIG. 2 shows an exemplary system for compiling optimized database statements according to embodiments of the present invention. As shown in FIG. 2, the system includes a client computing system (194), a query compiler computing system (152), and a cloud-based data warehouse (192). The client computing system (194) includes a graphical user interface (GUI) (202). The query compiler computing system (152) includes a query compiler (126). The cloud-based data warehouse (192) includes a database (204). The query compiler computing system (152) is an intermediary computing system between the client computing system (194) and the cloud-based data warehouse (192).

The GUI (202) is a visual presentation configured to present data sets in the form of worksheets and graphical elements to a user. The GUI (202) also receives requests from a user for data sets from the database (204). The GUI (202) may be presented, in part, by the query compiler (126) and displayed on a client computing system (194) (e.g., on a system display or mobile touchscreen). The GUI (202) may be part of an Internet application that includes the query compiler (126) and is hosted on the query compiler computing system (152).

The database (204) is a collection of data and a management system for the data. A data set is a collection of data (such as a table) from the database (204). Data sets may be organized into columns and rows (also referred to as records). The particular columns, rows, and organization of the columns and rows that make up a data set may be specified in the database statement requesting the data set. A data set, as sent from the database to the query compiler computing system (152) and client computing system (194), may be a portion or subset of a source database table on the database.

The query compiler (126) is hardware, software, or an aggregation of hardware and software configured to receive a state specification from the client computing system (194), via the GUI (202). The query compiler (126) is also configured to generate database query statements in response to manipulations of the GUI (202) described in the state specification. The query compiler (126) may be part of a database query generator that generates the database statements.

The state specification is a collection of data describing inputs into the GUI (202). The state specification may include manipulations of GUI elements within the GUI (202) along with data entered into the GUI (202) by a user of the client computing system (194). Such manipulations and data may indicate requests for and manipulations of data sets. The state specification may be a standard file format used to exchange data in asynchronous browser-server communication. For example, the state specification may be a JavaScript Object Notation specification.

The state specification may include descriptions of elements that are used to apply changes to the data set. Such elements may include filters applied to the worksheet, the hierarchical level of the worksheet, joins performed within the worksheet, exposable parameters in the worksheet, and security for the worksheet. An exposable parameter is variable within a worksheet function that can be presented and adjusted without presenting, adjusting, or otherwise exposing the worksheet function itself. Security for the worksheet may include hiding portions of the data set that the particular user or a particular group of users is not authorized to view.

The query compiler (126) uses the state specification as input to generate a database statement (also referred to as a query). This transformation process may begin with state specification being converted into an abstract syntax tree. The abstract syntax tree may then be canonicalized into a canonicalized hierarchy. The canonicalized hierarchy may then be linearized into the worksheet algebra. The worksheet algebra may then be lowered into a relational algebra, which may then be lowered into the database query.

Figure 3:
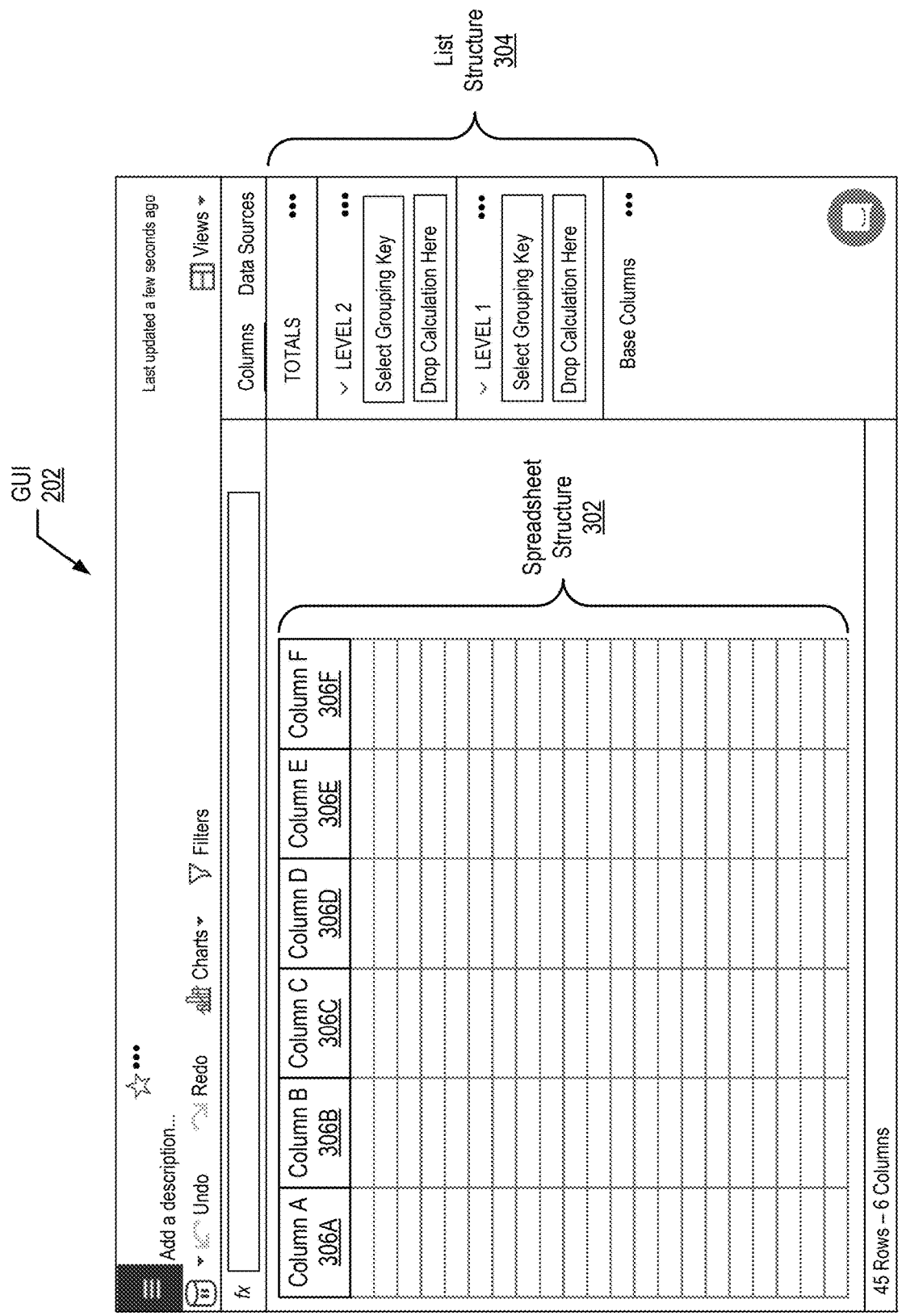
FIG. 3 sets forth a block diagram of an example system configured for compiling optimized database statements according to embodiments of the present invention.

FIG. 3 shows an exemplary system for compiling optimized database statements according to embodiments of the present invention. As shown in FIG. 3, the exemplary GUI (202) includes a spreadsheet structure (302) and a list structure (304). The spreadsheet structure (302) includes a worksheet (shown as empty rows) with six columns (column A (306A), column B (306B), column C (306C), column D (306D), column E (306E), column F (306F)).

The spreadsheet structure (302) is a graphical element and organizing mechanism for a worksheet that presents a data set. A worksheet is a presentation of a data set (such as a table) from a database on a data warehouse. The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculation columns that include calculation results using other columns in the worksheet.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

The GUI (202) may also include a mechanism for a user to request a table from a database to be presented as a worksheet in the GUI (202). Such a mechanism may be part of the interactivity of the worksheet. Specifically, a user may manipulate a worksheet (e.g., by dragging and dropping columns or rows, resorting columns or rows, etc.) and, in response, the GUI (202) may generate a request (e.g., in the form of a state specification) for a data set and send the request to the query compiler (126). Such a mechanism may also include a direct identification of the rows and columns of a database table that a user would like to access (e.g., via a selection of the rows and columns in a dialog box).

Figure 4:
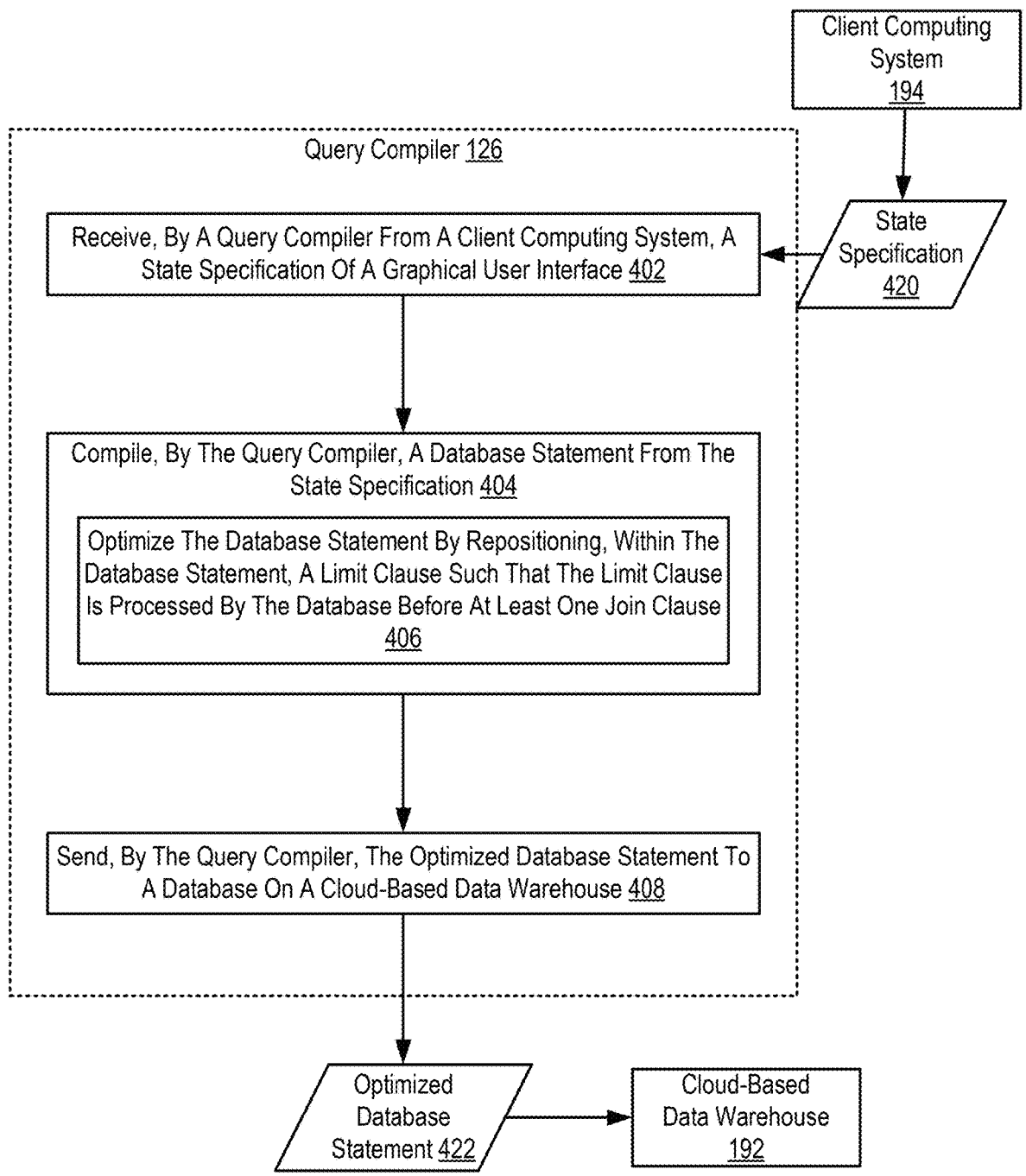
FIG. 4 sets forth a flow chart illustrating an exemplary method for compiling optimized database statements according to embodiments of the present invention.

For further explanation, FIG. 4 sets forth a flow chart illustrating an exemplary method for compiling optimized database statements according to embodiments of the present invention that includes receiving (402), by a query compiler (126) from a client computing system (194), a state specification (420) of a graphical user interface. Receiving (402), by a query compiler (126) from a client computing system (194), a state specification (420) of a graphical user interface may be carried out by detecting that a user has manipulated elements of the GUI and/or submitted data using the GUI such that the generation of a state specification (420) is triggered, and the state specification (420) is sent to the query compiler (126). The state specification (420) may then be received in response to the user manipulating the GUI on the client computing system (194). For example, a user may select a table from a group of tables presented for display in a worksheet on the GUI. As another example, a user may change the order of columns in the dimensional hierarchy of the GUI. Each change to the GUI may result in a new or updated state specification.

The method of FIG. 4 further includes compiling (404), by the query compiler (126), a database statement from the state specification (420). Compiling (404), by the query compiler (126), a database statement from the state specification (420) may be carried out by converting or lowering the state specification into various intermediate forms. Such intermediate forms may include an abstract syntax tree, a canonicalized hierarchy, a worksheet algebra, and a relational algebra. During each of these intermediate forms, the query compiler (126) may optimize the database statement to efficiently retrieve the targeted dataset from the database. The resulting database statement may be a structured query language statement (SQL).

The method of FIG. 4 further includes optimizing (406) the database statement by repositioning, within the database statement, a limit clause such that the limit clause is processed by the database before at least one join clause. A limit clause is any database instruction that identifies a maximum number of records or rows for the result data set. A join clause is any database instruction that combines columns in a database for the result data set. The columns may be from at least two different tables from the database. Optimizing (406) the database statement by repositioning, within the database statement, a limit clause such that the limit clause is processed by the database before at least one join clause may be carried out by moving the limit clause toward the beginning of the database statement, superseding one or more join clauses. Repositioning the limit clause ahead of a join clause results in a database statement that limits the number of records subject to the join thereby reducing the required processing resources relative to limiting number of records after a join is performed. Optimization generally refers to reducing the amount of database processing required to generate a result data set by repositioning instructions within the database statement and/or replacing instructions within the database statement with equivalent instructions or combinations of instructions.

The method of FIG. 4 further includes sending (408), by the query compiler (126), the optimized database statement (422) to a database on a cloud-based data warehouse (192). Sending (408), by the query compiler (126), the optimized database statement (422) to a database on a cloud-based data warehouse (192) may be carried out by issuing the database statement (422) to a database on the cloud-based data warehouse (192). The optimized database statement is optimized as described above prior to transmission over a network to the database on the cloud-based data warehouse (192). Upon receiving the optimized database statement (422), the database on the cloud-based data warehouse (192) may perform additional optimizations on the optimized database statement (422). The database may then process the optimized database statement (422) to generate the result data set. Finally, the result data set is then transmitted back to the query compiler computing system for presentation on the GUI of the client computing system (194).

The above limitations improve the operation of the computer system by optimizing a database statement during compilation from a human-readable input in the form of a GUI state specification. This is accomplished by converting the state specification into the optimized database statement by repositioning a limit clause such that the limit clause is processed by the database before at least one join clause resulting in a database statement that limits the number of records subject to the join thereby reducing the required processing resources relative to limiting number of records after a join is performed.

Figure 5:
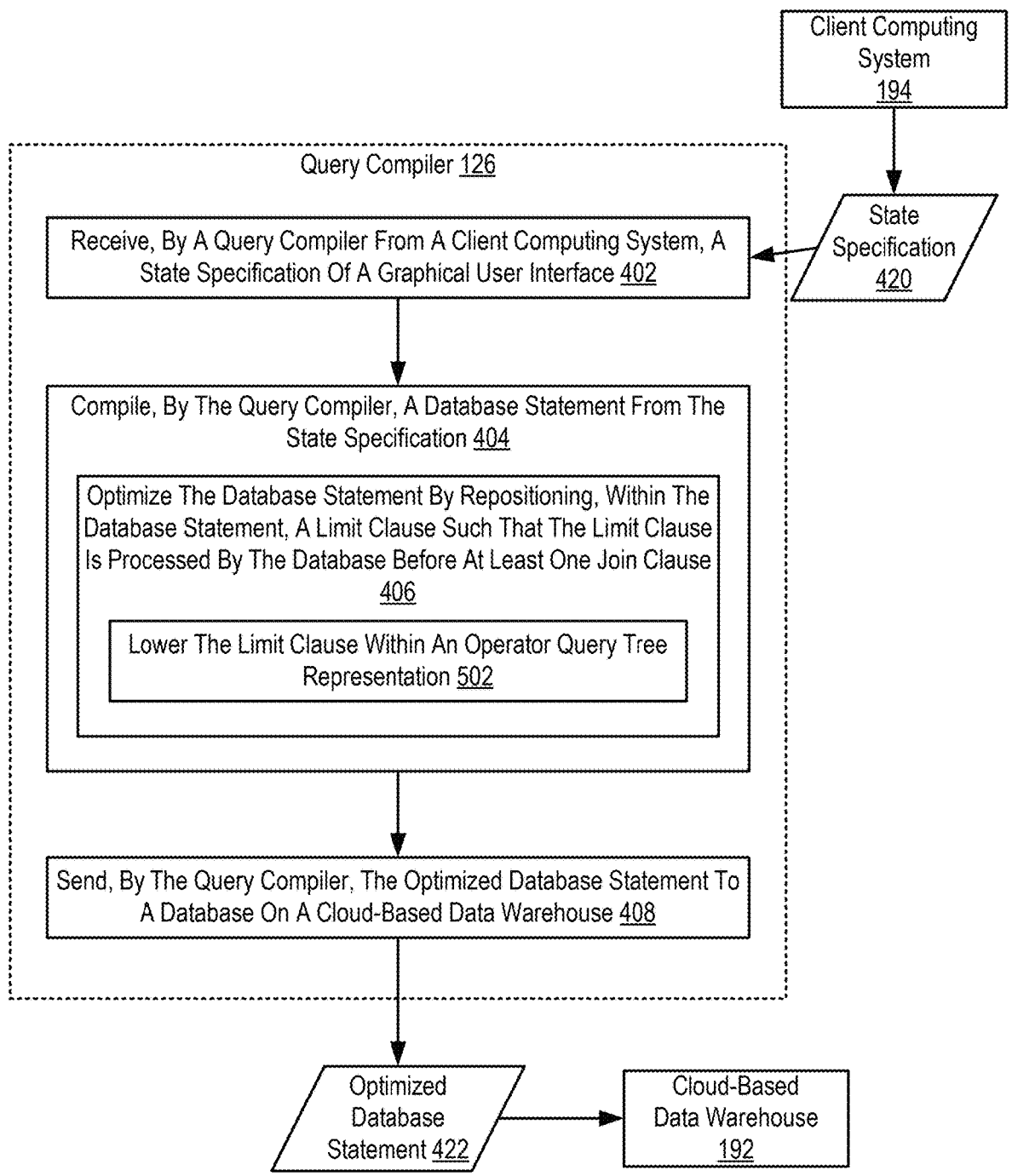
FIG. 5 sets forth a flow chart illustrating an exemplary method for compiling optimized database statements according to embodiments of the present invention.

For further explanation, FIG. 5 sets forth a flow chart illustrating a further exemplary method for compiling optimized database statements according to embodiments of the present invention that includes receiving (402), by a query compiler (126) from a client computing system (194), a state specification (420) of a graphical user interface; compiling (404), by the query compiler (126), a database statement from the state specification (420), including: optimizing (406) the database statement by repositioning, within the database statement, a limit clause such that the limit clause is processed by the database before at least one join clause; and sending (408), by the query compiler (126), the optimized database statement (422) to a database on a cloud-based data warehouse (192).

The method of FIG. 5 differs from the method of FIG. 4, however, in that optimizing (406) the database statement by repositioning, within the database statement, a limit clause such that the limit clause is processed by the database before at least one join clause includes lowering (502) the limit clause within an operator query tree representation (also referred to as an abstract syntax tree). The intermediate forms between the state specification and the optimized database statement may include an operator query tree representation in which operators are organized in a tree hierarchy based on the order of operations of the database statement. The term operator refers to instructions and clauses within the database statement (e.g., limit clauses, join clauses). Lowering (502) the limit clause within an operator query tree representation may be carried out by searching the operator query tree representation to determine whether a limit clause exists in a higher level position in the operator query tree representation than a join clause. If this condition exists, the limit clause may be moved in the operator query tree representation to a position lower than the join clause. The movement may be further based on other determinations, as described below with reference to FIG. 6.

Figure 6:
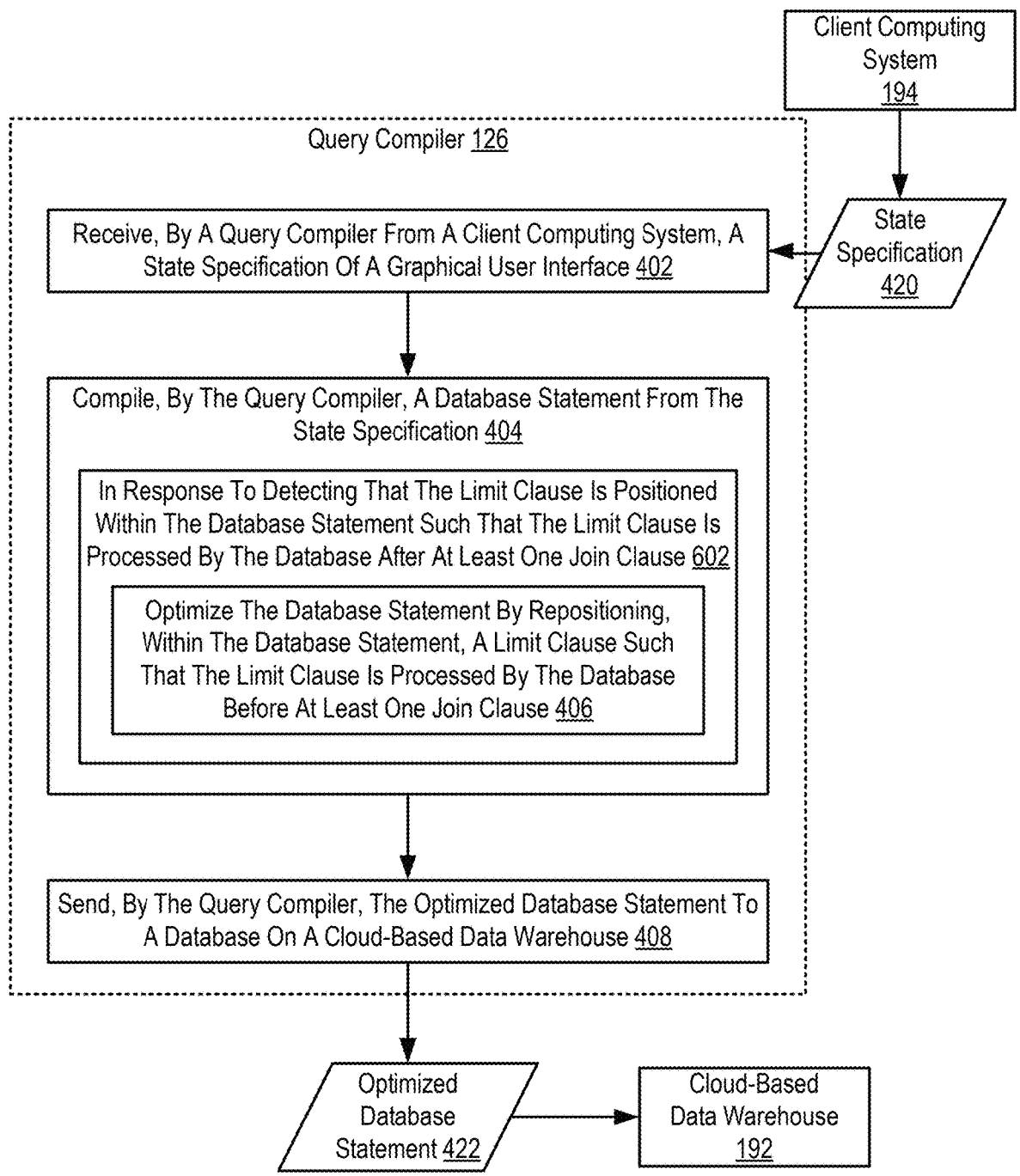
FIG. 6 sets forth a flow chart illustrating an exemplary method for compiling optimized database statements according to embodiments of the present invention.

For further explanation, FIG. 6 sets forth a flow chart illustrating a further exemplary method for compiling optimized database statements according to embodiments of the present invention that includes receiving (402), by a query compiler (126) from a client computing system (194), a state specification (420) of a graphical user interface; compiling (404), by the query compiler (126), a database statement from the state specification (420), including: optimizing (406) the database statement by repositioning, within the database statement, a limit clause such that the limit clause is processed by the database before at least one join clause; and sending (408), by the query compiler (126), the optimized database statement (422) to a database on a cloud-based data warehouse (192).

The method of FIG. 6 differs from the method of FIG. 4, however, in that optimizing (406) the database statement by repositioning, within the database statement, a limit clause such that the limit clause is processed by the database before at least one join clause is performed in response to detecting (602) that the limit clause is positioned within the database statement such that the limit clause is processed by the database after at least one join clause.

The ability to reposition the limit clause as described above may require various determinations to ensure that doing so would not result in a non-equivalent result data set, would not cause an error (e.g., a syntax error), and would not require a greater amount of database processing then the unoptimized database statement. Each of these determinations may result from either evaluating, by the query compiler, the state specification and intermediary forms or imposing and maintaining, by the query compiler, a particular worksheet structure within the system.

Evaluating, by the query compiler, the state specification and intermediary forms may include detecting (602) that the limit clause is positioned within the database statement such that the limit clause is processed by the database after at least one join clause. Detecting (602) that the limit clause is positioned within the database statement such that the limit clause is processed by the database after at least one join clause may be carried out by scanning the processing order of the database statement and determining the relative positions of each limit clause and each join clause.

Either evaluating, by the query compiler, the state specification and intermediary forms or imposing and maintaining, by the query compiler, a particular worksheet structure within the system may enable the query compiler to determine an expected number of record results. Specifically, determining an expected number of results may be carried out by evaluating, by the query compiler, the state specification and intermediary forms to extrapolate an expected number of record results in the results data set. Determining an expected number of results may also be carried out by imposing and maintaining, by the query compiler, a particular worksheet structure within the system. This particular structure may include limiting the manner in which the worksheet may be manipulated within the GUI.

Determining an expected number of results may also be carried out by maintaining primary keys of the tables outside of the database and cloud-based data warehouse (192). A primary key is a column in which each row is unique (i.e., different from every other row in the column). The level hierarchy of the worksheet may be generated using these primary keys. Further, instead of storing primary keys on the database, the query compiler (128) may maintain, on the query compiler computing system, a repository of columns from two or more tables on the database that include equivalent unique values that may be matched to join the two associated tables. Consequently, the query compiler (128) can ensure that each value in the column (or combination of values in different columns) of primary keys is unique. Because the primary keys are unique, the number of records in a resulting data set can be accurately anticipated.

In view of the explanations set forth above, readers will recognize that the benefits of compiling optimized database statements according to embodiments of the present invention include:

Improving the operation of a computing system by optimizing outgoing database statements reducing processing resources on a target database, increasing computing system efficiency and usability.

Improving the operation of a computing system by maintaining a structure of state specifications to enable optimization, increasing computing system efficiency and usability.

Exemplary embodiments of the present invention are described largely in the context of a fully functional computer system for compiling optimized database statements. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of compiling optimized database statements, the method comprising:
    receiving, by a query compiler from a client computing system, a state specification of a graphical user interface;
    compiling, by the query compiler, an optimized database statement from the state specification such that a limit clause within the optimized database statement is processed by a database before at least one join clause, wherein the limit clause identifies a maximum number of records or rows for a result dataset; and sending, by the query compiler, the optimized database statement to a database on a cloud-based data warehouse.

2. The method of claim 1, wherein compiling the optimized database statement comprises lowering the limit clause within an operator query tree representation, and wherein the optimized database statement has a data format different from the received state specification.

3. The method of claim 1, wherein compiling the optimized database statement comprises repositioning, within the optimized database statement, the limit clause such that the limit clause is processed by the database before the at least one join clause.

4. The method of claim 1, wherein compiling the optimized database statement is in response to determining an expected number of record results.

5. The method of claim 1, wherein the graphical user interface comprises a worksheet presenting a data set from the cloud-based data warehouse.

6. The method of claim 1, wherein, upon receiving the optimized database statement, the database on the cloud-based data warehouse performs additional optimizations on the optimized database statement.

7. The method of claim 1, wherein the optimized database statement is compiled on an intermediary computing system between the client computing system and the cloud-based data warehouse.

8. The method of claim 1, wherein the optimized database statement is a structured query language statement.

9. An apparatus for compiling optimized database statements, the apparatus comprising a computer processor, a computer memory operatively coupled to the computer processor, the computer memory having disposed within it computer program instructions that, when executed by the computer processor, cause the apparatus to carry out the steps of:

receiving, by a query compiler from a client computing system, a state specification of a graphical user interface;

compiling, by the query compiler, an optimized database statement from the state specification such that a limit clause within the optimized database statement is processed by a database before at least one join clause, wherein the limit clause identifies a maximum number of records or rows for a result dataset; and sending, by the query compiler, the optimized database statement to a database on a cloud-based data warehouse.

10. The apparatus of claim 9, wherein compiling the optimized database statement comprises lowering the limit clause within an operator query tree representation.

11. The apparatus of claim 9, wherein compiling the optimized database statement comprises repositioning, within the optimized database statement, the limit clause such that the limit clause is processed by the database before the at least one join clause.

12. The apparatus of claim 9, wherein compiling the optimized database statement is in response to determining an expected number of record results.

13. The apparatus of claim 9, wherein the graphical user interface comprises a worksheet presenting a data set from the cloud-based data warehouse.

14. The apparatus of claim 9, wherein, upon receiving the optimized database statement, the database on the cloud-based data warehouse performs additional optimizations on the optimized database statement.

15. The apparatus of claim 9, wherein the optimized database statement is compiled on an intermediary computing system between the client computing system and the cloud-based data warehouse.

16. The apparatus of claim 9, wherein the optimized database statement is a structured query language statement.

17. A computer program product for compiling optimized database statements, the computer program product disposed upon a non-transitory computer readable storage medium, the computer program product comprising computer program instructions that, when executed, cause a computer to carry out the steps of:

receiving, by a query compiler from a client computing system, a state specification of a graphical user interface;

compiling, by the query compiler, an optimized database statement from the state specification such that a limit clause within the optimized database statement is processed by a database before at least one join clause, wherein the limit clause identifies a maximum number of records or rows for a result dataset; and sending, by the query compiler, the optimized database statement to a database on a cloud-based data warehouse.

18. The computer program product of claim 17, wherein compiling the optimized database statement comprises lowering the limit clause within an operator query tree representation.

19. The computer program product of claim 17, wherein compiling the optimized database statement comprises repositioning, within the optimized database statement, the limit clause such that the limit clause is processed by the database before the at least one join clause.

20. The computer program product of claim 17, wherein compiling the optimized database statement is in response to determining an expected number of record results.

* * * * *